United States Patent [19]
Corso

[11] Patent Number: 5,666,274
[45] Date of Patent: Sep. 9, 1997

[54] RAPID ASSEMBLY PORTABLE ELECTRONIC DEVICE AND CLIP

[75] Inventor: Steven J. Corso, Pompano Beach, Fla.

[73] Assignee: JTECH Inc., Boca Raton, Fla.

[21] Appl. No.: 598,271

[22] Filed: Feb. 8, 1996

[51] Int. Cl.⁶ .................................................. H04B 1/03
[52] U.S. Cl. .................. 361/814; 361/732; 361/725; 361/727; 361/759; 455/347; 455/348
[58] Field of Search .................... 361/724–727, 361/728, 720, 732, 740–741, 759, 796, 781, 802, 807, 814, 828; 455/347–348, 349, 90, 351; 312/8.4

[56] References Cited

U.S. PATENT DOCUMENTS

| | | | |
|---|---|---|---|
| 4,089,044 | 5/1978 | Gatto et al. | 361/814 |
| 4,620,426 | 11/1986 | Pitchford et al. | 62/457.5 |
| 4,631,640 | 12/1986 | Umetsu et al. | 361/814 |
| 4,641,370 | 2/1987 | Oyamada | 455/348 |
| 4,879,759 | 11/1989 | Matsumoto et al. | 455/348 |
| 4,956,895 | 9/1990 | Hayasaka | 24/3.11 |
| 5,081,709 | 1/1992 | Benyo et al. | 455/348 |
| 5,261,122 | 11/1993 | Otsuki et al. | 455/90 |
| 5,265,275 | 11/1993 | Goldenberg et al. | 455/348 |
| 5,356,060 | 10/1994 | Kuroda | 224/670 |

*Primary Examiner*—Leo P. Picard
*Assistant Examiner*—Anthony Dinkins
*Attorney, Agent, or Firm*—Lane, Aitken & McCann

[57] ABSTRACT

A rapid assembly electronic device includes a housing and a chassis which snap together and are movable relative to one another between a closed position and a position in which a battery compartment on the chassis is accessible from the outside. The chassis is separable from the housing by the use of a pointed tool. A resilient clip is received in a receptacle on the housing, the clip being held in place by resilient engagement with the housing in three ways. The electronic device is operated from the exterior by a resilient element mounted in an opening in the housing and without a physical connection between the resilient element and any parts which are movable with the chassis.

21 Claims, 6 Drawing Sheets

RAPID ASSEMBLY PORTABLE ELECTRONIC DEVICE AND CLIP

BACKGROUND OF THE INVENTION

The present invention relates to housings for portable electronic devices and, more particularly, to a rapid assembly radio receiver, such as a pager.

Pagers and other radio devices are known which are easily supportable by hand, are battery operated, and include a housing. Typically, the housing is made in two or more parts which are held together by screws or other removable fasteners so that the fasteners can be removed to provide access to the internal components of the device. A problem with screws and other releasable fasteners is the time required to install them during initial assembly of the device, as well as the time to remove them and reinstall them when access to the interior of the housing is required. Furthermore, screws and other removable fasteners may be lost. In addition, pagers and other radio devices are typically operated by a battery, and access to the battery is provided by a removable cover. As a result, there is potential for loss of the battery cover. For pagers and other equipment, a clip is provided so that the pager may be worn on a belt or the like.

Operation of the electrical equipment contained within the device, usually in the form of a printed circuit board, typically requires connecting a control device on the housing to the circuit board. The connecting step is an additional step which increases the time and cost of making the devices.

SUMMARY OF THE INVENTION

By the present invention, a rapid assembly electronic device has two pieces, a housing and a chassis, which snap together. No screws or other removable fasteners are involved. In addition, after initial assembly, the housing and the chassis are movable relative to one another between a position in which the housing is closed and a position in which the housing is open and access to a battery is provided. Movement from the closed position to the open position requires a finger release of detents in the housing. The chassis is completely separable from the housing with the use of a pointed tool.

Also by the present invention, a clip is provided which is easy to attach to the housing without the use of fasteners, inexpensive to produce, and easy to replace in the field. Simultaneous pressure from three different angles to deform the clip in three different ways is necessary for the removal of the clip, thereby making inadvertent removal unlikely.

Operation of the electronic device is achieved by an element mounted on the housing and having no connection to the circuitry of the electronic device, which is typically in the form of a printed circuit board. This arrangement permits easier assembly of the circuit board with the housing, as well as any necessary removal and replacement of the circuit board. The operating element comprises a resiliently biased button mounted on the housing adjacent to a circuit defined on the circuit board. In one embodiment, an electrically conducting element, such as a carbon pill, is mounted on the button facing the circuit. Depression of the button by hand causes the carbon pill to contact two portions of a circuit, thereby completing the circuit and actuating the device. In another embodiment, a switch is mounted on the circuit board in alignment with the button, and depression of the button actuates the switch.

DETAILED DESCRIPTION OF THE PREFERRED EMBODIMENTS

Figure 1:
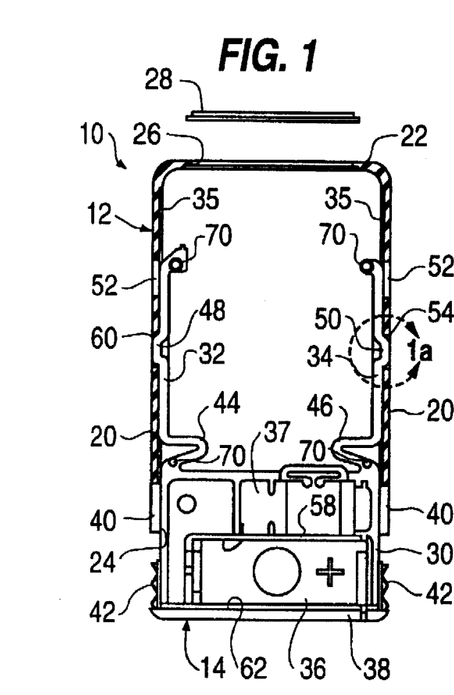
FIG. 1 is a vertical cross section through a device according to the present invention in an open position permitting access to a battery.
Figure 2:
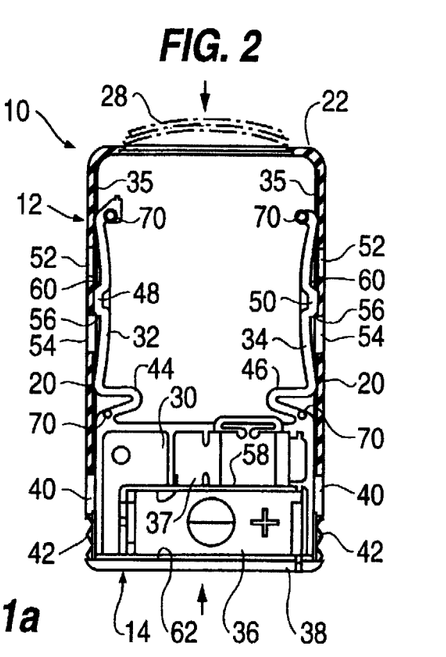
FIG. 2 is a vertical cross section of the device of FIG. 1 intermediate the open position and a closed position.
Figure 3:
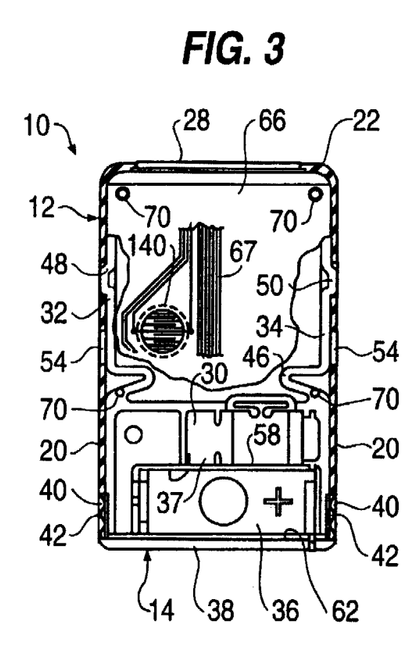
FIG. 3 is a vertical cross section through the device of FIG. 1 in a closed position.
Figure 4:
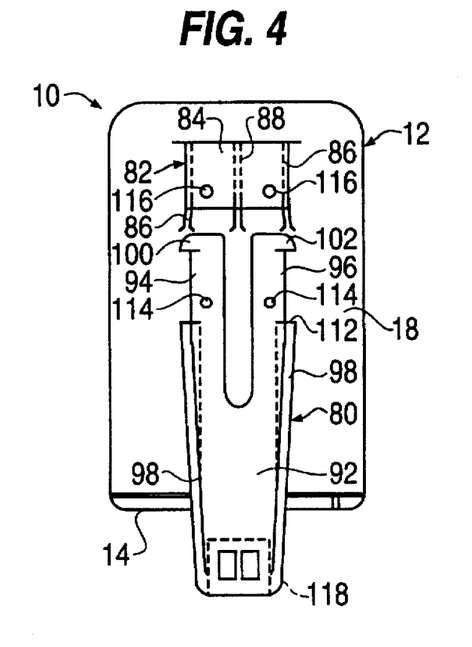
FIG. 4 is a rear elevation of the device of FIG. 3, with a clip according to the present invention in position for insertion into a socket on the housing.

As can be seen from FIGS. 1–3, the portable electronic device according to the present invention, which is typically a pager and which is designated generally by the reference numeral 10, includes a housing 12 and a chassis 14. As can best be seen from FIGS. 4, 5 and 10–13, the housing 12 includes a front wall 16, a rear wall 18, opposed side walls 20, a top wall 22 and an opening 24 at the bottom. The top wall defines an opening 26 into which a resilient clear lens 28 can be deformed and inserted (FIGS. 1–3 and 11). Through the lens 28 an LED display communicating pertinent information to the user can be seen. The housing 12 is made of a lightweight high-strength material, such as a high-strength thermoplastic.

The chassis 14 includes a body 30 defining a width, generally parallel spring rails 32, 34 formed in one piece with the body and projecting from the body at the extremities of the body width. The width of the chassis body 30 is substantially equal to the width of the opening 24 at the bottom of the housing 12, and the spring rails 32, 34 resiliently engage and slide along inner surfaces of the side walls 20 of the housing 14. More specifically, the rails 32, 34 are received in and slide in vertical grooves 35 defined in the inner surfaces of the side walls 20 of the housing 12. A battery compartment 36 and a motor compartment 37 are defined on the body 30 of the chassis 14 for receiving, respectively, a battery and a motor for powering the electronic device 10. Conventional leads (not shown) for electrically connecting the battery to circuitry of the electronic device 10 are provided in the battery compartment 36. A transverse panel 38 is formed in one piece with the chassis 14 at an end of the chassis adjacent to the bottom opening 24 of the housing 12. The panel 38 extends beyond the body 30 of the chassis 14 in all directions and has a size and shape equal to the size and shape of a transverse cross section of the housing 12 taken at the bottom opening of the housing. As a result, the panel 38 on the chassis 14 closes the bottom opening 24 of the housing 12 when the chassis is fully inserted into the housing. Slots 40 are defined in the side walls 20 of the housing 12 at the bottom end of the housing. The slots 40 have open ends at the bottom, by which the slots are contiguous with the bottom opening 24 of the housing 12. Gripping elements 42 are defined on the chassis 14 in alignment with the slots 40 in the side walls 20 of the housing 12. The gripping elements 42 project upwardly from the widthwise ends of the panel 38 and define an exterior surface having formations, such as ridges and grooves, to facilitate a firm grip when the gripping elements are engaged by the fingers of a user. When the chassis 14 is fully inserted into the housing 12, the gripping elements 42 fill the slots 40 in the housing and are accessible from the exterior of the housing. The slots 40 are wide enough to permit the fingers of an adult to grip the gripping elements 42.

The resilient rails 32, 34 are biased against the side walls 20 of the housing 12 by the resilience of the material of the rails and their configuration to have, in a relaxed state, surfaces spaced from one another by a distance greater than the distance between inner surfaces of the side walls 20 of the housing. The chassis 14, including the rails 32, 34, is made of a resilient plastic, and a bend 44, 46 is included in each rail adjacent to a connection between the rail and the body 30 of the chassis 14 to enhance the biasing of the rails away from one another. At about the midpoint of each of the rails 32, 34, a detent formation 48, 50 projects away from the opposite rail and toward the adjacent side wall 20 of the housing 12. Each side wall 20 of the housing defines an upper aperture 52 and a lower aperture 54, the apertures of each side wall being in alignment with the corresponding aperture on the opposite side wall. Each aperture 52, 54 has a size and shape to accommodate the detent formations 48, 50 on the adjacent rail 32, 34. The detent formation 48, 50 is biased into either of the apertures 52, 54 when the detent formation is in alignment with the aperture.

As can be seen from FIGS. 1 and 2, the distance between lower boundaries of the lower apertures 54 and the bottom end of the housing 12 is substantially equal to the vertical distance between detent surfaces 56 on lower sides of the detent formations 48, 50 and an upper wall 58 of the battery compartment 36. As a result, when the detent formations 48, 50 on the rails 32, 34 are received in the lower apertures 54, the chassis 14 projects from the bottom of the housing 12 a sufficient amount to provide access to the battery compartment 36 for inserting or removing a battery.

Figure 1A:
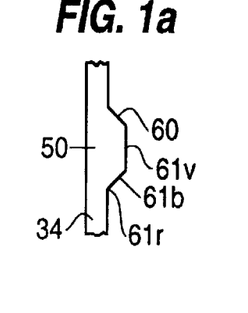
FIG. 1a is an enlarged view of the detent in the circle 1a in FIG. 1.

As can be seen from FIG. 2, upper surfaces 60 of the detent formations 48, 50 are angled to cam the rails 32, 34 toward one another when the chassis is moved farther into the housing 12 from the position shown in FIG. 1 and a surface of the side wall 20 defining the upper boundary of the lower aperture 54 is engaged by the angled upper surface 60, as can be seen from FIG. 2. A suitable angle for the upper surfaces 60 is 45° from the vertical as shown in FIGS. 1 and 1a. At the bottom of the detent formations 48, 50 are fillets such as the fillet 61r having a radius of curvature of about 0.015 inches and extending over an arc of about 90° from the vertical. An angled surface 61b extends from an end of the fillet 61r to a vertical surface 61v of the detent members 48, 50 at an angle of, for example, 30° from the vertical.

As can be seen from FIG. 3, the upper apertures 52 are positioned between the lower apertures 54 and the upper end of the housing 12. The distance between a surface of the side wall 20 defining the bottom of the upper aperture 52 and the bottom end of the housing 12 is substantially equal to the distance between the detent surface 56 on the detent formation 48 and an upper surface 62 of the panel 38. As a result, when the chassis 14 is fully inserted in the housing 12, the upper surface 62 of the panel 38 engages the bottom end of the housing, and the detent formations 48, 50 on the rails 32, 34 project into the upper apertures 52, where they engage the surfaces defining the bottoms of the upper apertures, thereby maintaining the electronic device 10 according to the present invention in a closed condition.

Figure 5:
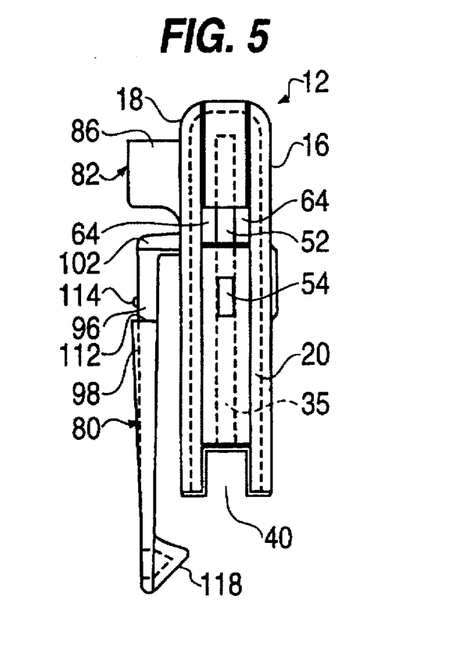
FIG. 5 is a right side view of the device of FIG. 4, with the chassis removed.
Figure 6:
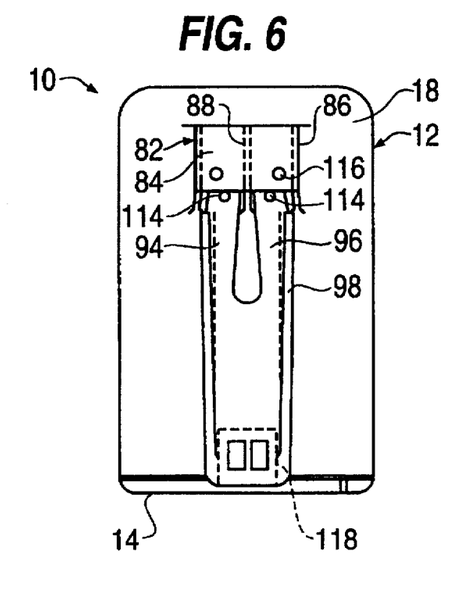
FIG. 6 is a rear elevation of the device of FIG. 3, with the clip partially inserted into the socket.
Figure 7:
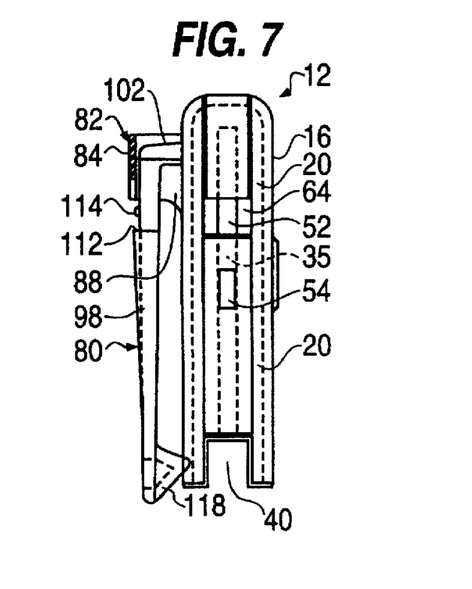
FIG. 7 is a right side view of the device of FIG. 6, with the chassis removed.
Figure 8:
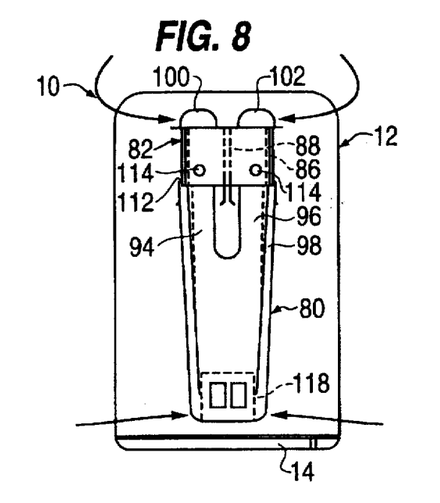
FIG. 8 is a rear elevation of the device of FIG. 3, with the clip fully inserted.
Figure 9:
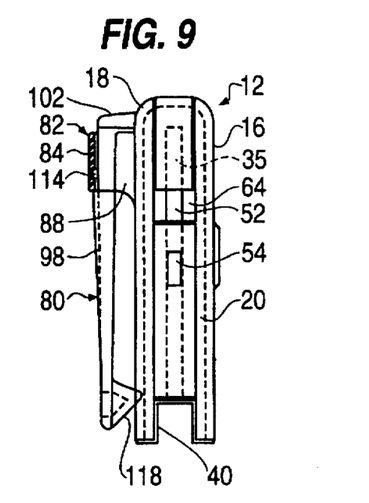
FIG. 9 is a right side view of the device of FIG. 8, with the chassis removed.
Figure 10:
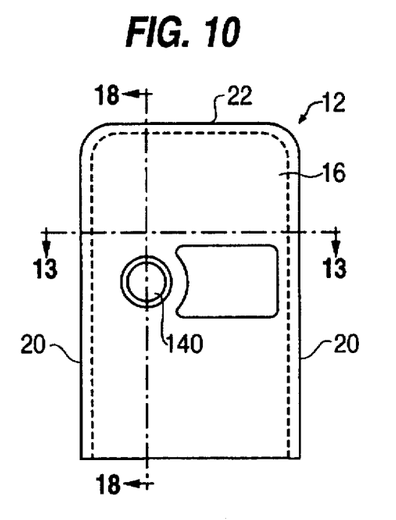
FIG. 10 is a front view of the housing of the device of FIG. 3.
Figure 11:
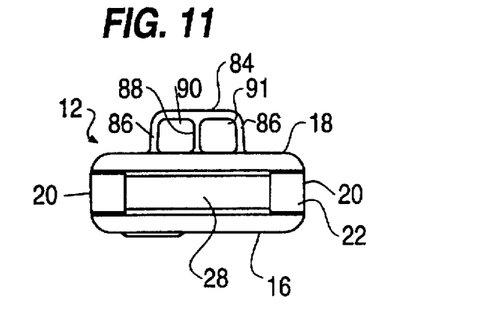
FIG. 11 is a top view of the housing of FIG. 10.
Figure 12:
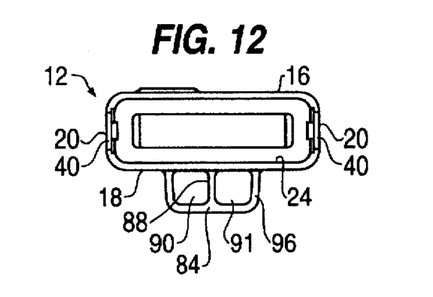
FIG. 12 is a bottom view of the housing of FIG. 10.
Figure 13:
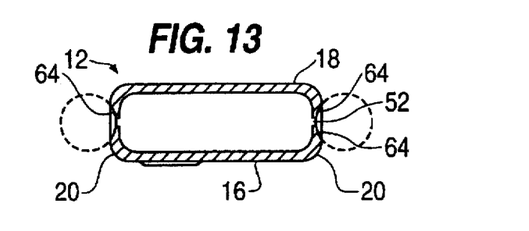
FIG. 13 is a cross section taken along the line 13—13 in FIG. 10.
Figure 14:
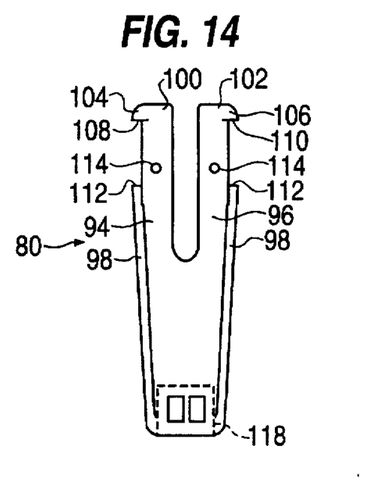
FIG. 14 is a front elevation of the clip of FIG. 8.
Figure 15:
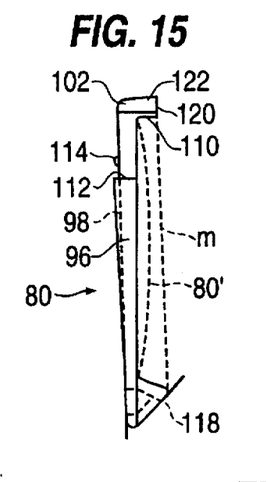
FIG. 15 is a right side view of the clip of FIG. 14.
Figure 16:
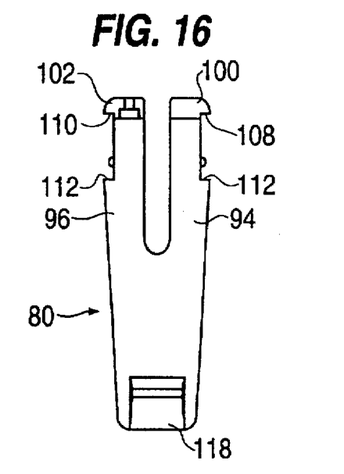
FIG. 16 is a rear elevation of the clip of FIG. 14.
Figure 17:
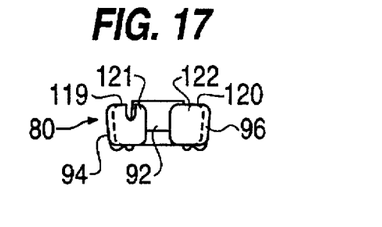
FIG. 17 is a top view of the clip of FIG. 14.

As can be seen from FIGS. 5 and 13, bevels or other indentations, such as arcuate indentations 64, are formed in the side walls 20 of the housing 12 between the upper apertures 52 and the front and rear walls 16 and 18 of the housing. The indentations 64 define recesses which permit the finger of an adult to push the detent formations 48, 50 of the rails 32, 34 sufficiently into the housing 12 to release the chassis 14 from its closed position. Without the recesses, the finger of an adult cannot sufficiently enter the apertures 52 to release the chassis. Indentations are not provided for the lower apertures 54 and, therefore, adult fingers cannot enter the lower apertures 54 sufficiently to push the detent formations 48, 50 into the housing 12 to release the chassis 14. Therefore, unintentional separation of the chassis 14 from the housing 12 is prevented. However, the chassis 14 can be separated from the housing 12 by the use of a sharp instrument to push the detent formations 48, 50 sufficiently into the housing to release the chassis. Since the upper surfaces 60 of the detent formations 48, 50 are angled, neither fingers nor sharp instruments are needed to release the chassis 14 for upward movement from the battery-access position of FIG. 1 or the closed position of FIG. 3. Upward force on the chassis 14 is all that is required.

Figure 18:
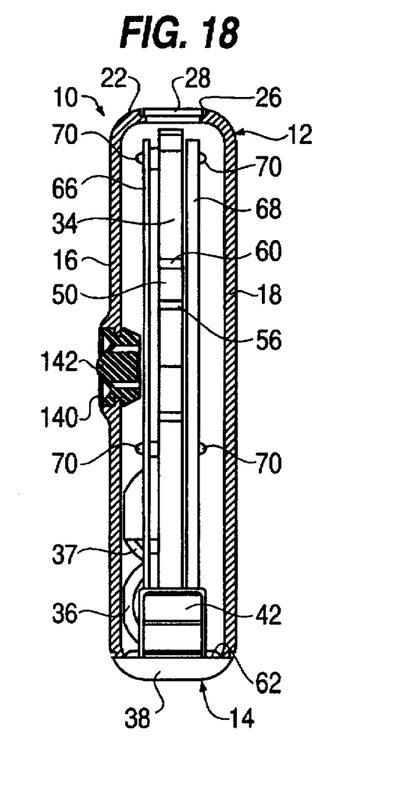
FIG. 18 is a cross section taken along the line 18—18 in FIG. 10, with the control button and the chassis in position.

As can be seen from FIGS. 3 and 18, the electrical circuitry performing the desired functions of the electronic device is in the form of printed circuit boards 66, 68 mounted on the chassis 14. More specifically, the circuit boards 66, 68 are mounted on posts 70 projecting from the rails 32, 34 toward the front wall 16 and the back wall 18 of the housing 12. On each side of the chassis 14, one of the posts 70 projects from each rail 32, 34 in the area of the connection of the rail with the body 30 of the chassis 14, and one of the posts 70 projects from an end of the rail remote from the connection.

As can be seen from FIGS. 4–12 and 14–17, a clip 80 is provided with the housing 12 for connecting the housing to a support, particularly for supporting the housing on a piece of apparel, such as a belt. The clip 80 is received in a receptacle 82 formed in one piece with the housing 12 and located on the back wall 18 of the housing near the upper end. The receptacle 82 includes a front wall 84 and side walls 86 extending from sides of the front wall 84 to the back wall 18 of the housing 12. In addition, a vertical web 88 extends from the front wall 84 of the receptacle 14 to the back wall 18 of the housing 12 to further secure the receptacle to the housing and to define two vertical openings 90, 91 for receiving the clip 80.

The clip 80 includes a body 92 and two legs 94, 96 projecting from the body, the legs being spaced from one another and generally parallel to one another. The clip 80 is made of a resilient plastic. As can be seen from FIGS. 14 and 15, flanges 98 project forwardly from the clip 80, in a direction away from the housing 12, the flanges 98 extending from a point approximately midway along the length of the legs 94, 96 to the bottom of the clip, the flanges tapering from the midpoint to the bottom, where the flanges are substantially flush with the body 92 of the clip. Ends of the legs 94, 96 remote from the body include end formations 100, 102, each of which projects rearwardly from the clip 80, in a direction toward the housing 12, and define a shoulder 104, 106, respectively, which projects laterally, in a direction away from the other leg. Each shoulder 104, 106 defines a surface 108, 110 facing an upper end of the flange 98, and the distance between the surface of the shoulder and the upper end of the flange is just slightly greater than the vertical dimension of the side walls 86 of the receptacle 82. Furthermore, in a relaxed condition of the clip 80, the distance between the lateral extremities of the end formations 100, 102 of the two legs 94, 96 and upper surfaces 112 of the flanges 98 is just slightly greater than the vertical dimension of the side walls 86 of the receptacle 82. Furthermore, an upper surface of each end formation 100, 102 is rounded or beveled toward the adjacent side of the clip 80. When the legs 94, 96 of the clip 80 are inserted into the openings 90, 91 in the receptacle 82, the engagement of the rounded or beveled upper surfaces of the end formations 100, 102 of the legs 94, 96 with lower surfaces of the side walls 86 of the receptacle 82 cams the legs inwardly, deflecting the legs, so that the legs can enter the openings. The camming action induces a resilient laterally outward bias in the legs 94, 96. When the lower surface 108, 110 of each end formation 100, 102 passes the upper surface of the adjacent side wall 86 of the receptacle 82, the legs 94, 96 snap outwardly, and notches defined between the lower surfaces 108, 110 of the upper end formations 100, 102 and the upper surfaces 112 of the flanges 98 capture the side walls 86 of the receptacle.

A protrusion 114 is formed on a front surface of each of the legs 94, 96 between the shoulders 104, 106 and the upper surfaces 112 of the flange 98. Holes 116 defined in the front wall 84 of the receptacle 82 are sized and shaped to receive the protrusions 114 and are positioned to be in alignment with the protrusions when the legs 94, 96 snap in place against the side walls 86 of the receptacle 82.

A protuberance 118 adjacent a lower end of the clip so projects rearwardly, toward the housing 12, the protuberance 118 having a rearward extremity. When the clip 80 is snapped in place in the receptacle, the protuberance 118 engages the housing 12, as do rear surfaces 119, 120 of flanges 121, 122 extending rearward from the end formations 100, 102 of the legs 94, 96. In a relaxed state of the clip 80, the distance between either of the protrusions 114 and a line 'm' extending between the rearward extremity of the protuberance 118 and the rear surfaces 119, 120 of the flanges 121, 122 is greater than the distance from the housing 12 to a rear surface of the from wall 84 of the receptacle 82. Thus, insertion of the legs 94, 96 of the clip 80 into the openings 90, 91 in the receptacle 82 requires resilient deflection of the clip 80 toward the housing 12, as is indicated by the dashed line 80' in FIG. 15. When the legs 94, 96 snap laterally outward, capturing the side walls 86 of the receptacle 82, the resilience of the clip 80 also forces the protrusions 114 into the holes 116 in the from wall 84 of the receptacle 82. This engagement prevents removal of the clip 80 from the receptacle 82 by mere lateral squeezing together of the legs 94, 96. In addition, the upper surfaces 112 of the flanges engage a bottom surface of the front wall 84 of the receptacle 82.

Figure 19:
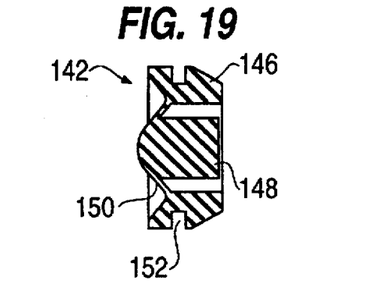
FIG. 19 is an enlarged cross section of the control button of FIG. 18.
Figure 20:
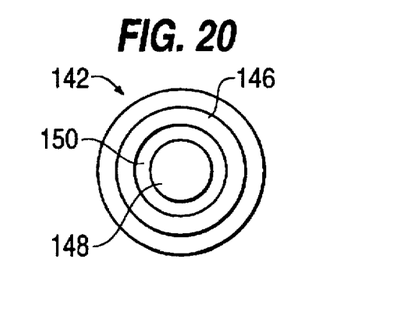
FIG. 20 is a right side view of the control button of FIG. 19.

The housing 12 is made of one piece, and insertion of the chassis 14 into the housing is simple and easy. The retention of the chassis 14 in the housing 12 in the closed position is associated with the bottom panel 38 of the chassis 14 sealing the opening 24 in the bottom of the housing. Furthermore, need for any connection between the chassis 14 and devices on the housing 12 for controlling the operation of the electronic device 10 is avoided. In this regard, as can be seen from FIGS. 18–20, the printed circuit board 66 faces the front wall 16 of the housing 12, the circuit board 66 having printed electrical circuitry, including two circuit portions spaced from one another. In the closed position of the electronic device 10, the space between circuit portions is in alignment with an opening 140 in the front wall 16 of the housing 12. A resilient element 142 having no physical connection to the circuit board 66 or the chassis 14 is mounted in the opening 140. The resilient element 142 comprises an annular skirt 146, a central body 148 spaced from the skirt, and an annular resilient membrane 150 connecting the skirt to the body. In addition, the annular skirt 146 defines an annular groove 152 to receive a portion of the front wall 16 of the housing 12 defining the opening 140. Engagement of the front wall 16 with the annular groove 152 retains the resilient element 142 in the opening 140. An electrically conducting element 154, such as a carbon pill, is mounted on a rear surface of the central body 148 of the resilient element 142 in alignment with the space between the circuit portions. In a relaxed condition of the resilient element 142, its resilience maintains the electrically conducting element 154 in spaced relation from the circuit portions. Depression of the resilient element 142 from the exterior causes the electrically conducting element 154 to contact the circuit portions and complete a circuit. The resilience of the resilient element 142 enables the resilient element to space the electrically conducting element from the circuit portions when the deflecting force is removed.

Figure 21:
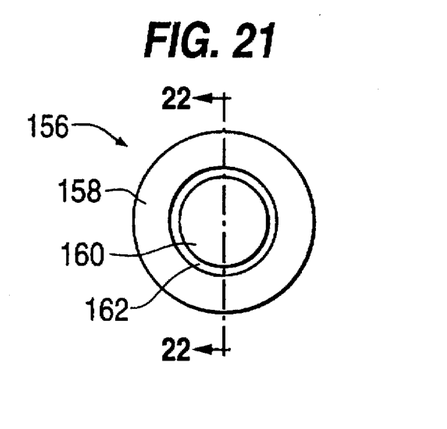
FIG. 21 is a front elevation of an alternate form of control button.
Figure 22:
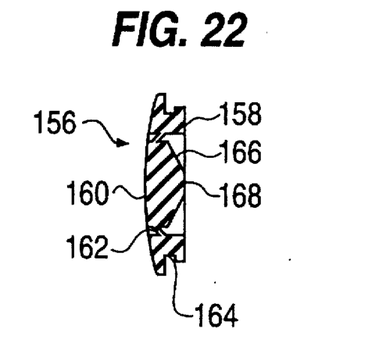
FIG. 22 is a cross section taken along the line 22—22 in FIG. 21.
Figure 23:
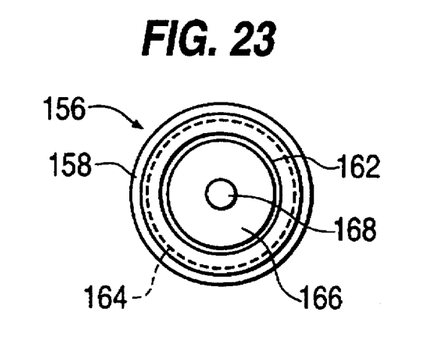
FIG. 23 is a rear elevation of the control button of FIG. 21.
Figure 24:
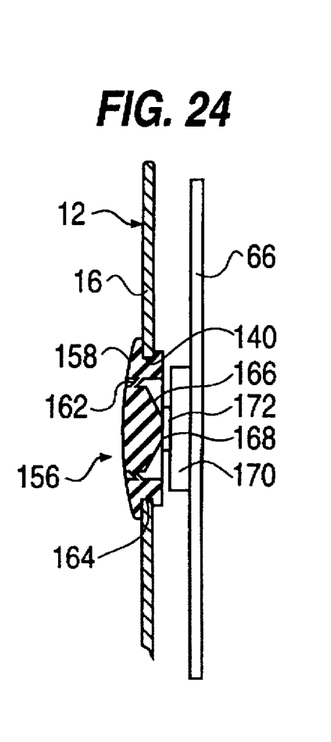
FIG. 24 is a fragmentary cross section showing the control button of FIG. 22 mounted in the housing in cooperation with a switch mounted on the circuit board.
Figure 25:
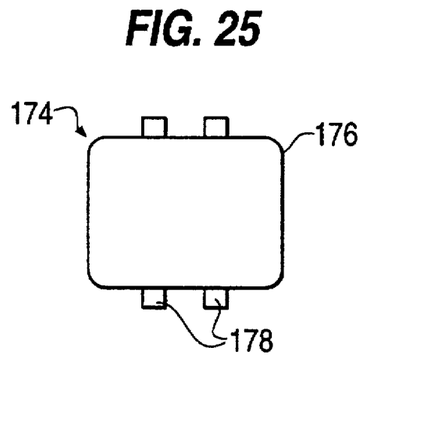
FIG. 25 is a front view of a release button for use in accordance with an alternate embodiment of the present invention.
Figure 26:
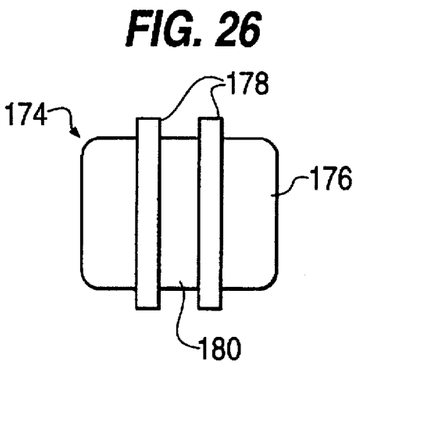
FIG. 26 is a rear view of the release button of FIG. 25.
Figure 27:
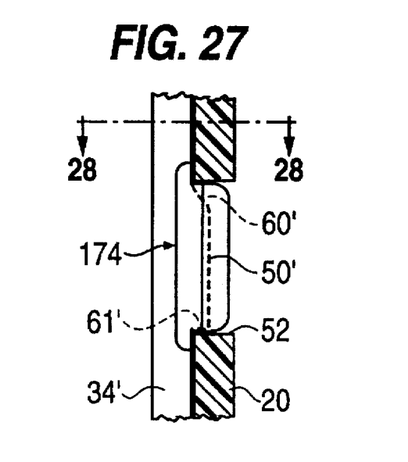
FIG. 27 is a cross section of a fragment of a side wall of a housing according to the present invention showing the release button of FIG. 25 in position.
Figure 28:
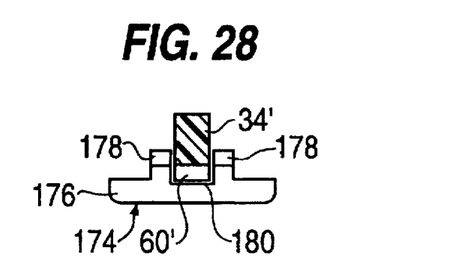
FIG. 28 is a cross section taken along the line 28—28 in FIG. 27, with the housing removed.

As can be seen from FIGS. 21–23 an alternate embodiment of resilient element 156 according to the present invention has generally the same characteristics as the resilient element 142, including an annular skirt 158, a central body 160 spaced from the skirt, and an annular resilient membrane 162 connecting the skirt to the body. In addition, the annular skirt 158 defines an annular groove 164 to receive a portion of the front wall 16 of the housing 12 defining the opening 140. A rear surface of the central body 160 includes a frustoconical portion 166 terminating in a transverse surface 168. As can be seen from FIG. 24, engagement of the front wall 16 of the housing 12 with the annular groove 164 retains the resilient element 156 in the opening 140. An electrical switch 170 is soldered or otherwise connected to the printed circuit board 66. The switch 170 includes a movable element or button 172 which changes the state of the switch 170 upon movement. The button 172 is in alignment with the transverse surface 168 on the rear of the body 160 of the resilient element 156. Removal of the depressing force results in movement of the body 160 away from the switch 170 due to the resilience of the resilient body and, perhaps, in addition, due to a biasing element associated with the button 172 of the switch 170.

As can be appreciated from FIGS. 25-28, a mechanism in the form of a release button 174 can be used to assist the fingers of a user in moving the detent formations of the spring rails inward in the upper apertures 52 of the side walls 20. As a result, greater inward movement of the detent formations is enabled and complete inward movement of the detent formations into the housing 12 is enabled. It is understood that a release button 174 is provided for each of the upper apertures 52, but only one release button will be described, since the release buttons are identical.

Each release button 174 includes a panel 176 which is engaged by a finger for releasing the detent of the spring rail, for example, the detent 50' of the spring rail 34'. The panel 176 has an exterior surface which is substantially flush with an exterior surface of the side wall 20. Two elongate, parallel guide elements 178 are formed in one piece with the panel 176, the guide elements being supported in a vertical orientation at a distance from a rear surface of the panel 176. As can be appreciated from FIG. 27, the extension of the guide elements 178 above and below the panel 176 retains the release button 174 in the upper aperture 52 by virtue of the engagement of the extensions with an inner surface of a side wall 20 of the housing 12 above and below the upper aperture. The guide elements 178 are spaced from one another by a distance substantially equal to the thickness of the spring rail 34', and the spring rail is received between the guide elements 178. As the chassis 14 is moved, the spring rail 34' slides relative to the release button 174, the sliding movement being guided by the guide elements 178. The release button 174 can be depressed by the finger of a user sufficiently that the detent formation 50' of the spring rail 34' is entirely inward of an inner surface of the side wall 20 of the housing 12. Because of this, a lower surface 61' of the detent formation 50' can be at right angles to the direction of sliding of the spring rail 34'. With the right-angle configuration of the lower surface 61', the spring rail 34' is securely locked in the upper aperture 52 and the chassis 14 is securely held from movement relative to the housing 12. An upper surface 60' of the detent formation 50' is oriented at an acute angle relative to the direction of sliding of the spring rail 34'. A rear surface 180 of the panel 176 is spaced from forward surfaces of the extensions of the guide elements 178 by a distance substantially equal to the distance by which the detent formation 50' extends outwardly from the spring rail 34'. By this structure, the detent formation 50' protrudes into the upper aperture 52 despite the presence of the release button 174 in the aperture.

It will be apparent to those skilled in the art and it is contemplated that variations and/or changes in the embodiment illustrated and described herein may be made without departure from the present invention. Accordingly, it is intended that the foregoing description is illustrative only, not limiting, and that the true spirit and scope of the present invention will be determined by the appended claims.

I claim:

1. A portable electronic device comprising:

a housing defining an opening;

a chassis sized to fit in said housing and to pass through said opening;

means defined on said chassis for receiving a battery;

first means for releasably retaining said chassis in a first position in said housing, said battery receiving means being positioned in said housing in said first position, second means for retaining said chassis in a second position, said battery receiving means being positioned outside said housing when said chassis is in said second position; and electrical circuit means mounted on said chassis, wherein said chassis is movable between said first and second positions.

2. The device of claim 1, wherein said second means for retaining comprises means for releasably preventing separation of said chassis from said housing.

3. The device of claim 1, wherein said housing defines at least one slot contiguous with said opening, and said chassis defines at least one gripping surface, said gripping surface being exposed through said slot when said chassis is in said first position.

4. The device of claim 1, wherein the housing defines two slots contiguous with said opening, said slots being arranged generally opposite one another across said opening, and said chassis defines two gripping surfaces, each said gripping surface being exposed through a respective one of said slots when said chassis is in said first position.

5. The device of claim 1, wherein said fist means for releasably retaining said chassis comprises at least one detent member made of a resilient material and at least one aperture through said housing in spaced relationship to said opening in said housing, said detent member projecting into said aperture in said first position of said chassis.

6. The device of claim 5, wherein said detent member is formed in one piece with said chassis.

7. The device of claim 5, further comprising means in said housing for receiving the finger of an adult to a depth sufficient to release said chassis from said first position, said receiving means comprising a depression contiguous with said aperture.

8. The device of claim 5, wherein said first means for releasably retaining said chassis comprises two detent members made of a resilient material and two apertures through said housing in spaced relationship to said opening in said housing, said housing having two opposite sides, said apertures being positioned in said opposite sides, and each of said detent members projecting into a respective one of said apertures when said chassis is in said first position.

9. The device of claim 8, further comprising detent release members positioned in said apertures for moving said detent members out of said apertures.

10. The device of claim 8, wherein said electrical circuit means comprises at least one circuit board and said detent members comprise means for mounting said circuit board on said chassis.

11. The device of claim 10, wherein the detent members comprise generally parallel rails each having a first end secured to said chassis, a second distal to said chassis, and means adjacent each of said ends for attaching said circuit board.

12. The device of claim 1, wherein said housing comprises a wall, and said electrical circuit means comprises two electrical conductors spaced from one another and facing said wall, the device further comprising means associated with said wall for selectively electrically connecting said two electrical conductors with one another.

13. The device of claim 12, wherein said wall defines an aperture, and said means for selectively electrically connecting comprises an elastomeric member mounted in said aperture and an electrically conducting member mounted on said elastomeric member, said electrically conducting member facing said two electrical conductors, and said elastomeric member being deformable toward said two electrical conductors to a point at which said electrically conducting member contacts said two electrical conductors.

14. The device of claim 1, wherein said housing comprises a wall defining an aperture and said electrical circuit means comprises a switch in alignment with said aperture when said chassis is in said first position, and said device further comprises means for operating said switch, said switch operating means comprising an elastomeric member mounted in said aperture and deformable toward said switch.

15. In combination, a housing for a portable electronic device and a clip for holding said housing on a support, wherein said housing includes a receptacle defining an opening for receiving said clip, said clip having a body and two legs projecting from said body, said legs being received in said opening in said receptacle, each said leg having a detent surface and means for biasing each said leg in a direction generally away from the other leg such that the detent surface is in clip-retaining engagement with a detent surface on said receptacle.

16. The combination of claim 15, further comprising means for locking said detent surface of said legs in clip-retaining engagement with the associated surface on said receptacle.

17. The combination of claim 16, wherein said receptacle includes a wall generally parallel to the direction in which said legs are biased, said means for locking comprises a protrusion on each of said legs and openings in said wall, said protrusions extending into said openings.

18. The combination of claim 17, further comprising means for biasing said protrusions into said openings in said wall.

19. The combination of claim 18, wherein said clip is resilient in a direction generally perpendicular to said wall, the means for biasing said protrusions comprising the resilience of the clip.

20. The combination of claim 15, further comprising means for preventing tilting of said clip in a direction generally parallel to the direction in which the legs are biased.

21. The combination of claim 15 wherein said housing defines a second opening, the combination further comprising a chassis sized to fit in said housing and to pass through said second opening;

means defined on said chassis for receiving a battery;

first means for releasably retaining said chassis in a first position in said housing, said battery receiving means being positioned in said housing in said first position, second means for retaining said chassis in a second position, said battery receiving means being positioned outside said housing in said second position; and electrical circuit means mounted on said chassis, wherein said chassis is movable between said first and second positions.

* * * * *